Aug. 5, 1924.
A. P. STIANSEN
1,503,774
CHAIN
Filed Dec. 12, 1921
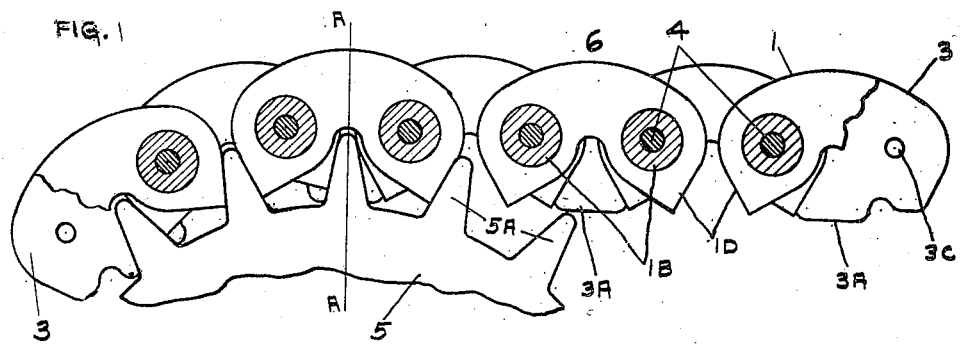
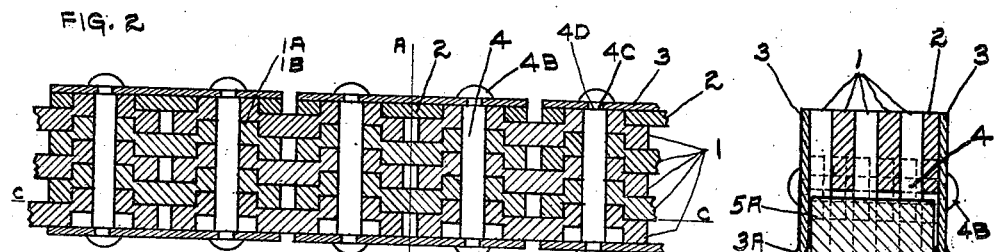
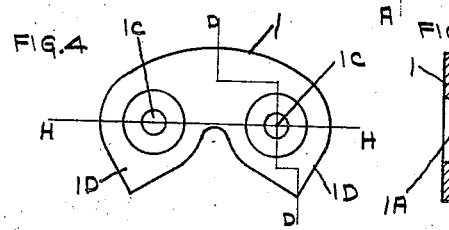  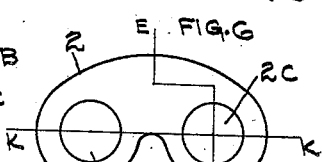 
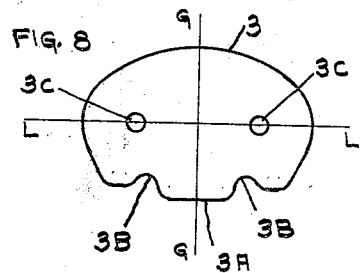 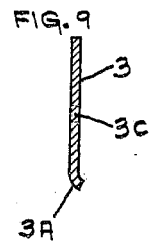
INVENTOR.
Anton Peter Stiansen Patented Aug. 5, 1924.

1,503,774

UNITED STATES PATENT OFFICE.

ANTON PETER STIANSEN, OF BROOKLYN, NEW YORK.

CHAIN.

Application filed December 12, 1921. Serial No. 521,881.

*To all whom it may concern:*

Be it known that I, ANTON PETER STIANSEN, a citizen of the United States, residing in the borough of Brooklyn, in the county of Kings, city and State of New York, have invented a certain Improvement in Chains, of which the following is a specification, such as will enable those skilled in the art to which it appertains to make and use the same.

This invention relates to chains, especially multiple strand chains, and particularly driving chains and more particularly to silent or angular-toothed chains.

An object of this invention is to increase the effective bearing area of the links comprising the chain; another object is to reduce the number of varied parts of which the chain is composed; another object is to provide a chain that can readily be assembled. Other objects will appear hereafter in the specifications and in the claims, discernible to those skilled in the art.

I attain these objects by the construction illustrated in the accompanying drawings, in which—

Figure 1 is a side view of a part of a gear or sprocket wheel having a piece of my improved drive chain mounted thereon and part of which is in section, the section being on line C—C of Fig. 2;

Fig. 2 a horizontal sectional view of a part of the chain extended and showing section on the lines, H—H of Fig. 4, K—K of Fig. 6, and L—L of Fig. 8;

Fig. 3 a transverse section on the line A—A of Figs. 1 and 2;

Fig. 4 a side view of one of the links of which the chain is composed;

Fig. 5 a section on the line D—D of Fig. 4;

Fig. 6 a side view of a side link which I may employ;

Fig. 7 a section on the line E—E of Fig. 6;

Fig. 8 a side view of one of the washer plates used in the construction of the chain;

Fig. 9 a section on the line G—G of Fig. 8.

Similar numerals refer to similar parts throughout the several views.

5 is a part of a gear or sprocket that may be used with my chain.

The chain 6 is composed of links 1 and 2 and washer plates 3 shown detached in Figs. 4 and 5, 6 and 7, 8 and 9 respectively.

Link 1 is a flat plate consisting of a body portion the opposite ends thereof forming angular teeth $1^D$ on which the teeth of the gear operate as shown in Fig. 1, the opposite ends of said body portion are also provided with cavities $1^A$ protrusions $1^B$ and apertures $1^C$ which constitute the journals or bearings on which said link 1 pivots.

Link 2 is a flat plate consisting of a body portion the contour of the edges thereof being substantially the same as those of link 1, and the opposite ends of said body portion having apertures $2^C$ on which said link 2 pivots when assembled on the protrusions $1^B$ of link 1.

Washer plate 3 is a flat plate consisting of a body portion the contour of the upper edge and opposite ends thereof being substantially the same as those of links 1 and 2, the contour of the lower edge of said body portion having notches $3^B$ and lip $3^A$, said notches being provided to facilitate the bending of said lip, and the opposite ends of said body portion having apertures $3^C$ that fit the smaller diameter $4^C$ of pin 4.

The assembly of the chain is clearly illustrated in Figs. 1, 2 and 3 which show the chain composed mainly of links 1. The cavities $1^A$ and protrusions $1^B$ on said link interlocking transversely with the adjoining links and pin 4 passed through the pin holes $1^C$ which said links are provided with in their opposite ends, said cavities and protrusions and said pin holes and pins having bearing on each other respectively, when the chain is in tension and providing pivotal bearings for the chain when in motion.

The link 2 I may employ on one side of the chain to fill in the space between link 1 and washer plate 3 thereby increasing the strength of the chain its bearing area and tooth area.

Transversely the links are held between the washer plates 3 which in turn are held between the rivet head $4^B$ and shoulder $4^D$ on pin 4, said washer plates 3 being spaced sufficiently apart to permit free pivotal movement of the links.

Lip $3^A$ on washer plate 3 is bent outwardly from the chain as shown in Fig. 3 so as to better guide the chain when entering on the sprocket.

In the accompanying drawings I have shown the cavities $1^A$ and protrusions $1^B$ cylindrical but I do not bind myself to this particular shape and I may vary either or both.

I do not bind myself to any particular manner of making the links; I may form them by die-casting, or by drop-forging or from sheet metal stamping, or in any other desired manner.

Having fully described my invention what I claim as new and desire to secure by Letters Patent, is;—

1. A chain composed of links 1 and 2, washer plates 3 and pins 4, said links 1 having pin holes $1^C$ through which said pins 4 are passed, said links 1 being also provided with cavities $1^A$ and protrusions $1^B$ that interlock with similar cavities and protrusions on the adjoining and cooperating links, said links 2 serving as a side link and being provided with apertures $2^C$, said apertures serving as bearings for the protrusions $1^B$ on the adjoining links 1, said links 1 and 2 being also provided in their opposite ends with toothed portions $1^D$ and $2^D$ respectively, on which the teeth of the sprocket operate, and said links being held transversely by said washer plates 3 and said pins 4; substantially as specified.

2. A power device comprising a gear and a drive chain mounted thereon and composed of links 1 and 2, links 1 consisting of body portions having pin holes in their opposite ends, and pins passed through said holes, the body portions of said links being provided around said pin holes with interlocking cavities and protrusions, links 2 consisting of flat body portions having substantially similar contours as links 1 and provided in their opposite ends with apertures, said apertures serving as bearings for said protrusions on the adjoining links 1, said body portions of links 1 and 2 being also provided in their opposite ends with toothed portions on which the teeth of the gears operate.

3. A power device comprising a gear and a drive chain mounted thereon and composed of links 1 and 2, links 1 consisting of flat body portions having pin holes in their opposite ends, and pins passed through said holes, the body portions of said links 1 being provided around said holes with cavities and protrusions, links 2 consisting of flat body portions having substantially similar contours as links 1 and provided in their opposite ends with apertures, said apertures serving as bearings for said protrusions on links 1, said body portions on links 1 and 2 being also provided in their opposite ends with toothed portions on which the teeth of the gear operate.

4. A power device comprising a gear and a drive chain mounted thereon, said chain being composed of links consisting of flat body portions having pin holes in their opposite ends, and pins passed through said holes, the body portion of said links being provided around said holes with interlocking cavities and protrusions, said cavities having a depth less than the thickness of said body portion, said body portion of said links being also provided in their opposite ends with toothed portion on which the teeth of the gear operate.

5. In a chain link having a toothed portion in the opposite ends thereof that is adaptable for contact with a toothed wheel or sprocket, a pivot bearing consisting of a lateral protrusion on the side of the link that is the effect of a lateral indentation on the opposite side thereof, said indentation having a depth less than the thickness of the link.

6. In a chain link having a toothed portion in the opposite ends thereof that is adaptable for contact with a toothed wheel or sprocket, a pivot bearing consisting of a lateral protrusion on the side of the link that is the effect of a lateral indentation on the opposite side thereof, said indentation having a depth less than the thickness of the link and said protrusion being adaptable to pivot within the said indentation in an adjacent and cooperating link.

7. In a chain link having a toothed portion in the opposite ends thereof that is adaptable for contact with a toothed wheel or sprocket, a pivot bearing consisting of an apertured protrusion on the side of the link and a substantially corresponding indentation on the opposite side thereof, said indentation having a depth less than the thickness of the link.

ANTON PETER STIANSEN.